(12) United States Patent  
Hill et al.

(10) Patent No.: US 6,250,170 B1
(45) Date of Patent: Jun. 26, 2001

(54) LOAD DIRECTING TRUNNION MOUNT FOR LINEAR ACTUATOR

(75) Inventors: Jason J. Hill, Manchester; Mark S. Evertowski, Florissant, both of MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/396,341

(22) Filed: Sep. 15, 1999

(51) Int. Cl.[7] .............................. F16H 25/20; F16H 57/02
(52) U.S. Cl. ............................................ 74/89.23; 254/103
(58) Field of Search ........................... 74/89.15, 424.8 R, 74/606 R, 89.23, 424.71; 254/103

(56) References Cited

U.S. PATENT DOCUMENTS

| | | | |
|---|---|---|---|
| Re. 25,659 | * 10/1964 | Chapman et al. | 74/424.8 R |
| 2,328,897 | * 9/1943 | Gill | 254/103 X |
| 3,416,386 | * 12/1968 | Pickles | 74/424.8 R |
| 4,295,384 | * 10/1981 | Brandt et al. | 74/89.5 X |

* cited by examiner

Primary Examiner—Allan D. Herrmann
(74) Attorney, Agent, or Firm—Howell & Haferkamp, L.C.

(57) ABSTRACT

A load directing trunnion mount for a linear actuator is constructed to receive all of the tensile forces exerted on the actuator shaft or lead screw of the linear actuator. In this manner, the load directing trunnion mount relieves a transmission drive element (for example, a drive gear or a sprocket or pulley) and the transmission housing enclosing the drive element from tensile forces exerted on the actuator shaft during use of the linear actuator.

20 Claims, 2 Drawing Sheets

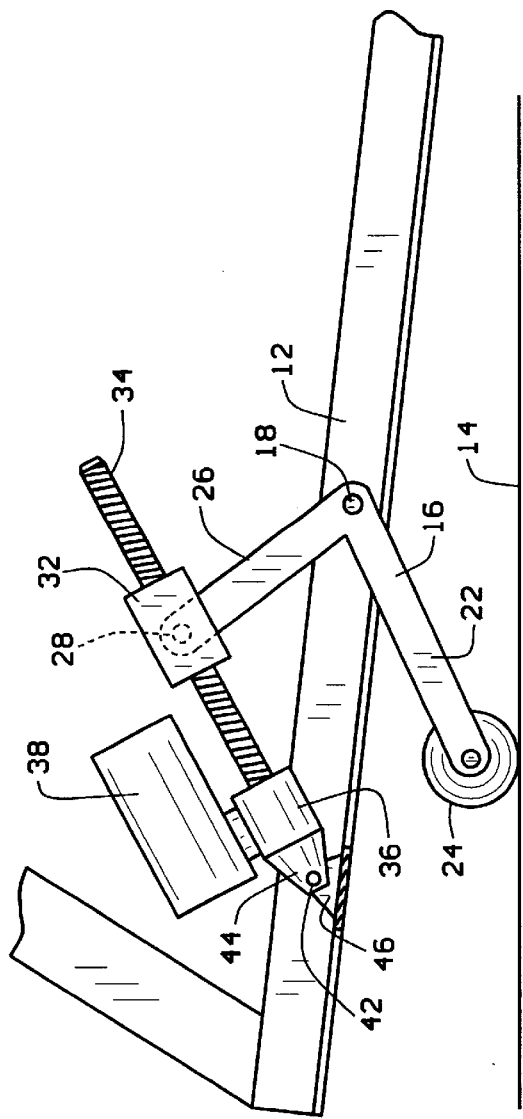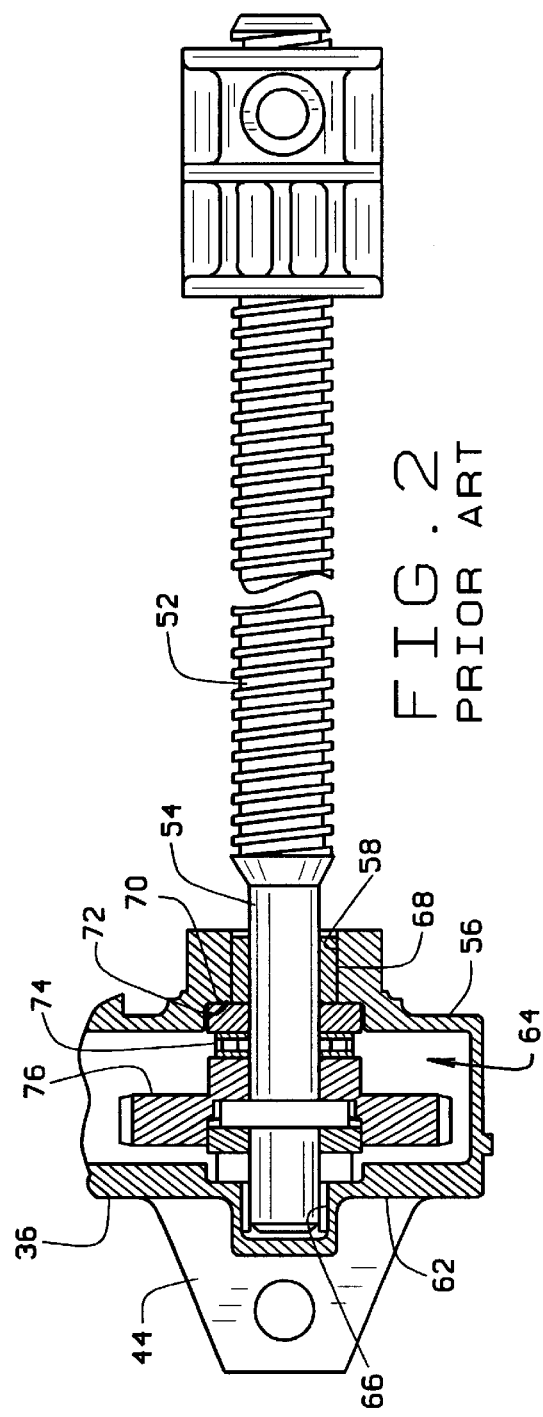

LOAD DIRECTING TRUNNION MOUNT FOR LINEAR ACTUATOR

BACKGROUND OF THE INVENTION (1) Field of the Invention

The present invention pertains to a load directing trunnion mount for a linear actuator that is constructed to receive all of the tensile forces exerted on the actuator shaft or lead screw of the linear actuator. In this manner, the load directing trunnion mount relieves a transmission drive element (for example, a drive gear or a sprocket or pulley) and the transmission housing enclosing the drive element from tensile forces exerted on the actuator shaft during use of the linear actuator.

(2) Description of the Related Art

A linear actuator of the type with which the present invention is concerned is basically a mechanism that converts rotational movement into linear movement. The mechanism includes a drive assembly that can be controlled to selectively rotate a screw threaded shaft or lead screw of the actuator in opposite directions. The drive assembly typically includes a motor, for example an electric motor, and a transmission coupling the motor output shaft to the lead screw. The transmission assembly can be a gearing assembly, a sprocket and chain assembly or a belt and pulley assembly. The linear actuator also includes a nut assembly that is mounted on the lead screw of the actuator for linear movement of the nut assembly along the lead screw in response to rotation of the lead screw. By rotating the lead screw in opposite directions of rotation, the nut assembly moves in opposite linear directions along the length of the lead screw.

FIG. 1 shows one operative environment of a linear actuator of the type described above. It is emphasized that the particular use made of the linear actuator in FIG. 1 is illustrative only. Linear actuators of the type shown are used in a variety of different environments where it is desired to convert reciprocating rotary movement to reciprocating linear movement.

FIG. 1 is a schematic representation of a cross section through a supporting frame of an adjustably elevating exercise treadmill of the prior art. The figure shows a cross section through a frame member 12 of the treadmill frame that supports the running deck (not shown) of the treadmill. The right-hand end of the frame member 12 is shown broken away, but the right-hand end of the frame member would rest on the supporting surface 14 on which the exercise treadmill is placed. The left-hand end or the elevating end of the treadmill frame is supported on a pair of bell cranks 16, only one of which is shown in FIG. 1. The bell cranks 16 are mounted to opposite frame members 12 of the frame by a pivot shaft 18. One arm 22 of each bell crank extends downwardly from the pivot shaft 18 to a cylindrical roller 24 mounted on the distal end of the arm. The roller 24 supports the forward or left-hand elevating end of the treadmill frame on the support surface 14. The second arm 26 of each bell cranks extends upwardly from the pivot shaft 18. The distal end of each second arm 26 is mounted by a pivot connection 28 to a nut assembly 32 mounted on the lead screw 34 of the linear actuator. The nut assembly 32 can have internal screw threading that is complementary to the external screw threading of the lead screw, or can be a recirculating ball type nut assembly or other type of nut assembly commonly employed with linear actuators of this type. The lead screw 34 is mounted for rotation inside a transmission housing 36 by a pair of bearings mounted in opposite walls of the transmission housing. The transmission housing 36 contains a transmission mechanism that includes a drive element, for example a gear, sprocket or pulley, that is secured to the lead screw 34 for rotation therewith. The drive element is driven by the transmission contained in the transmission housing 36 which in turn is driven by an electric motor 38. Exercise treadmills of this type commonly have controls (not shown) that can control the electric motor 38 to drive the transmission and ultimately the lead screw 34 in opposite directions of rotation. By controlling the rotation of the lead screw 34 in two directions, linear movement of the nut assembly 32 across the lead screw 34 is also controlled. The linear movement of the nut assembly 32 across the lead screw 34 controls pivoting movement of the bell cranks 16 about their pivot shaft 18 which in turn controls elevating movement, of the left-hand end of the treadmill shown in FIG. 1. For example, operation of the electric motor 38 to rotate the lead screw 34 causing the nut assembly 32 to move to the left as viewed in FIG. 1 will result in the bell cranks 16 rotating in a counterclockwise direction about its pivot shaft 18 and thus elevating the left-hand or forward end of the treadmill frame shown in FIG. 1. Controlling the electric motor 38 to rotate the lead screw 34 in the opposite direction causing the nut assembly 32 to move to the right as shown in FIG. 1 will cause the bell cranks 16 to move in a clockwise direction about their pivot shaft 18 resulting in the lowering of the treadmill frame shown in FIG. 1.

Transmission housings 36 of the type shown in FIG. 1 are commonly connected to the frame members 12 of the treadmill by a pivot pin 42 extending through a hole in a flange or flanges 44 of the transmission housing and a hole in a flange 46 mounted on the treadmill frame. When a load is placed on the treadmill, for example, by a jogger on the treadmill, the load is transmitted through the bell crank 16 to the lead screw 34 as a tensile force on the lead screw. This tensile force exerted on the lead screw 34 is transmitted to the transmission housing 36 and ultimately to the flanges 44 of the transmission housing that are connected by the pivot pin 42 to the flange 46 of the frame.

FIG. 2 shows a detailed view of a prior art linear actuator of the type employed in a treadmill such as that shown in FIG. 1. In FIG. 2, like parts of the linear actuator described in reference to FIG. 1 have the same reference numbers. FIG. 2 shows a distal portion 52 of the lead screw that extends outside the transmission housing 36 and has the nut assembly 32 mounted thereon. An opposite proximal portion 54 of the lead screw extends into the transmission housing 36. FIG. 3 is a partial view showing the prior art transmission housing 36 in cross section and the proximal portion 54 of the lead screw mounted in the transmission housing as well as the drive element mounted on the lead screw proximal portion.

Referring to FIG. 3, the transmission housing has a first end wall 56 with a first shaft opening 58 passing therethrough. An opposite second end wall 62, shown to the left in FIG. 3, encloses an interior volume 64 of the transmission housing with the first end wall 58. A cylindrical recess 66 is formed into the second end wall 62. The recess 66 is concentric with the first opening 58 through the housing first end wall 56. The proximal portion 54 of the lead screw extends through the first opening 58 of the housing and into the cylindrical recess 66 of the housing second end wall 62. Beginning at the right hand end of the lead screw proximal portion 54 shown in FIG. 3, the proximal portion is mounted for rotation in the first opening 58 by a bearing or bushing 68 mounted in the opening. A circular washer 70 is then mounted on the proximal portion 54 of the lead screw. The washer 70 seats against the bushing 68 and an annular shoulder 72 formed in the interior of the transmission housing first end wall 56. A thrust bearing 74 is then mounted on the lead screw proximal portion 54 seating up against the washer 70. The drive element is then mounted on the lead screw proximal portion 54. In FIG. 3, the drive element is a gear 76, but the drive element could be a sprocket for a chain drive or a pulley for a belt and pulley drive, depending on the particular transmission employed. The gear 76 has a circular recess 78 formed into the left-hand side of the gear as shown in FIG. 3, and then a slot 82 that is further recessed into the gear from the circular recess 78. The slot 82 extends across the center of the gear. A pin 84 is inserted through a pin hole 86 that passes through the lead screw proximal portion 54. The pin 84 is received in the slot 82 and thereby secures the gear 76 to the lead screw proximal portion 54 for rotation therewith. A first circular spacer 92 is then mounted on the shaft and is partially positioned in the circular recess 78 of the gear. A second spacer 94 or thrust washer is mounted on the shaft between the first spacer 92 and an interior surface of the transmission housing second end wall 62. The proximal portion 54 of the lead screw then extends into a bearing or bushing 96 that mounts the proximal portion 54 of the lead screw adjacent its proximal end 98 in the cylindrical recess 66 of the transmission housing second end wall 62.

The two bearings 68, 96 mount the proximal portion 54 of the lead screw for rotation in the respective first 56 and second 62 end walls of the transmission housing. The thrust bearing or thrust washer 74 transmits any tensile forces exerted on the lead screw 34 from the gear 76 to the thrust washer 70 and ultimately to the annular shoulder 72 of the transmission housing first end wall 56. In FIG. 3, the path of tensile forces exerted on the lead screw 34 is represented by the darkened line 102. As shown in FIG. 3, the tensile forces are first transmitted from the lead screw 34 to the pin 84 that secures the gear 76 to the proximal portion 54 of the lead screw. The pin 84 transmits the tensile forces to the gear 76 which then transmits the tensile forces through the thrust bearing 74, the thrust washer 70 to the annular shoulder 72 in the first end wall 56 of the transmission housing. The tensile forces transmitted to the transmission housing are then transmitted through the first end wall 56 of the housing to the second end wall 62 and ultimately to the pair of flanges 44 that are mounted by the pivot pin 42 to the frame flange 46.

Prior art linear actuator mountings of the type shown in FIGS. 1–3 have experienced several different types of failures when subjected to the repeated poundings of a relatively heavy jogger running on the treadmill supported by the linear actuator. The repeated pounding of the jogger on the treadmill produces repeated tensile forces exerted on the lead screw 34 that are transmitted through the transmission housing 36 to the housing flanges 44 in the manner described above. This has resulted in the transmission flanges 44 pulling and bending the second end wall 62 of the transmission housing away from the first end wall 56 of the transmission housing or to the left as viewed in FIG. 3. This can result in a bowing of the transmission housing second end wall 62 where it joins with the transmission flanges 44. In severe cases, the bowing of the second end wall 62 can result in the lead screw proximal portion 54 disengaging from inside the bearing 96 mounted in the second end wall 6 or in a cracking or splitting of the second end wall 62 in the area of the transmission flanges 44. Reinforcing the connection of the flanges 44 to the second end wall 62 of the housing, for example by adding gussets between the flanges and the end wall or by thickening the material of the end wall, would overcome this problem but would also increase the cost of manufacturing the trunnion mount for the linear actuator.

Prior art actuator mounts of the type disclosed in FIGS. 1–3 have often been constructed with plastic drive gears 76 to reduce their cost. However, the plastic drive gears 76 have also been known to fail as a result of repeated tensile forces exerted on the lead screw. A series of repeated tensile forces exerted on the lead screw 34 and transmitted through the pin 84 to the plastic gear 76 has resulted in cracking and splitting of the gear. This problem could be overcome by replacing the plastic gear 76 with a gear constructed of metal, however this would also increase the cost of manufacturing the trunnion mount.

In prior art trunnion mounts of the type disclosed in FIG. 3 that employ a metal drive gear 76 to avoid the problems of the splitting of plastic drive gears, the repeated tensile loading of the lead screw 34 is still transmitted to the pin 84. This often results in the pin 84 cracking in the slot 82 of the gear 76 resulting in a failure of the driving connection between the gear 76 and the lead screw 34.

What is needed to overcome the problems of the actuator mount described above is a way of transmitting the repeated tensile loading of the lead screw 34 to the frame flange 46 of the treadmill frame while avoiding transmission of the tensile forces to the drive element of the actuator transmission or to the transmission housing enclosing the drive element.

SUMMARY OF THE INVENTION

The present invention provides a trunnion mount that overcomes the problems associated with the prior art actuator mount by transmitting tensile forces exerted on the lead screw completely through the transmission housing to a trunnion mount that connects the lead screw to the frame flange of the treadmill frame, thus bypassing the transmission housing and the drive elements contained in the housing. The trunnion mount of the invention employs a transmission housing having axially aligned openings in opposite first and second end walls of the housing. The proximal portion of the lead screw extends completely through the housing through the axially aligned openings to a trunnion mount mounted on the proximal portion of the lead screw outside the transmission housing. The trunnion mount provides a pivot connection to the frame flange of the treadmill frame that is completely separate from the transmission housing. The proximal portion of the lead screw is mounted to the trunnion by a nut screw threaded on the proximal portion and a thrust bearing mounted on the proximal portion between the nut and the trunnion. Thus, the proximal portion of the lead screw is free to rotate relative to the trunnion. However, the nut mounted on the proximal portion of the lead screw and the thrust bearing mounted on the proximal portion of the lead screw between the nut and the trunnion transmit any tensile forces exerted on the lead screw through the nut and the thrust bearing directly to the trunnion. The proximal portion of the lead screw is mounted in the two housing end walls by bearings or bushings. The drive element or drive gear is mounted on the proximal portion of the lead screw inside the transmission housing by a pin, just as in the prior art. However, the drive gear is held in engagement with the pin by a pair of spring washers or Belleville springs mounted on the proximal portion of the lead screw between the gear and the first end wall of the transmission housing. Thus, any tensile forces exerted on the lead screw are transmitted through the proximal portion of the lead screw completely through the transmission housing and to the trunnion connecting the lead screw to the frame flange of the treadmill frame. In this manner, the opposed end walls of the transmission housing as well as the gear and the pin connecting the gear to the lead screw are completely separated from any tensile forces exerted on the lead screw.

BRIEF DESCRIPTION OF THE DRAWINGS

Further objects and features of the present invention are revealed in the following detailed description of the preferred embodiment of the invention and in the drawing figures wherein:

FIG. 1 is a schematic representation of one operative environment of a prior art linear actuator and a pivoting mount for the linear actuator;

FIG. 2 is a partial view of the linear actuator and pivoting mount of FIG. 1;

DETAILED DESCRIPTION OF THE PREFERRED EMBODIMENT

Figure 3:
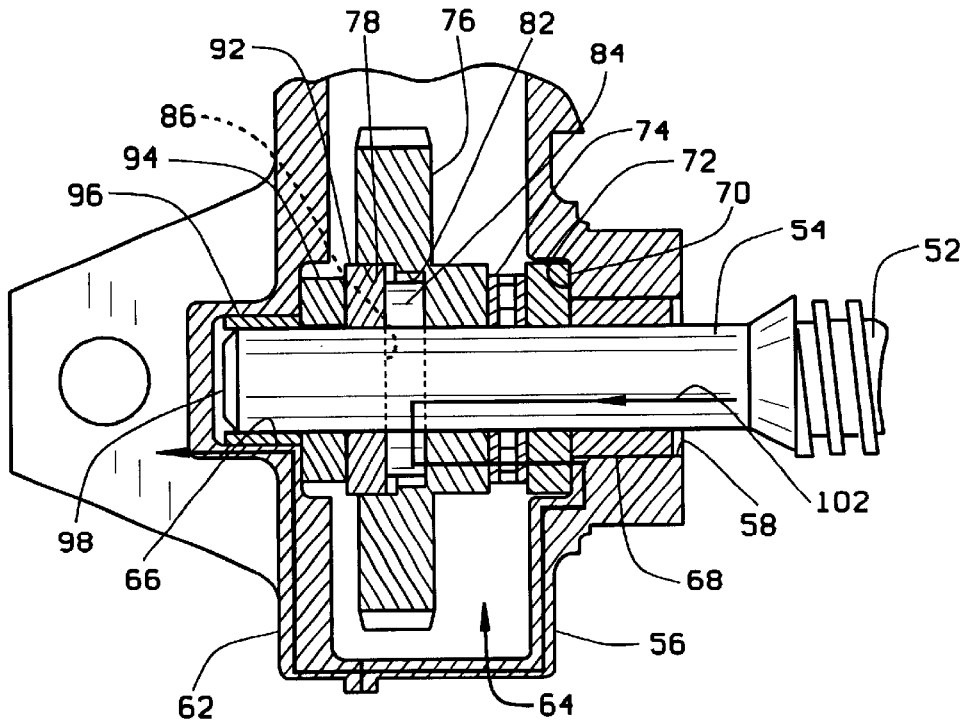
FIG. 3 is a partial view showing the detail of the pivoting mount of FIG. 1 and the drive element of the linear actuator.
Figure 4:
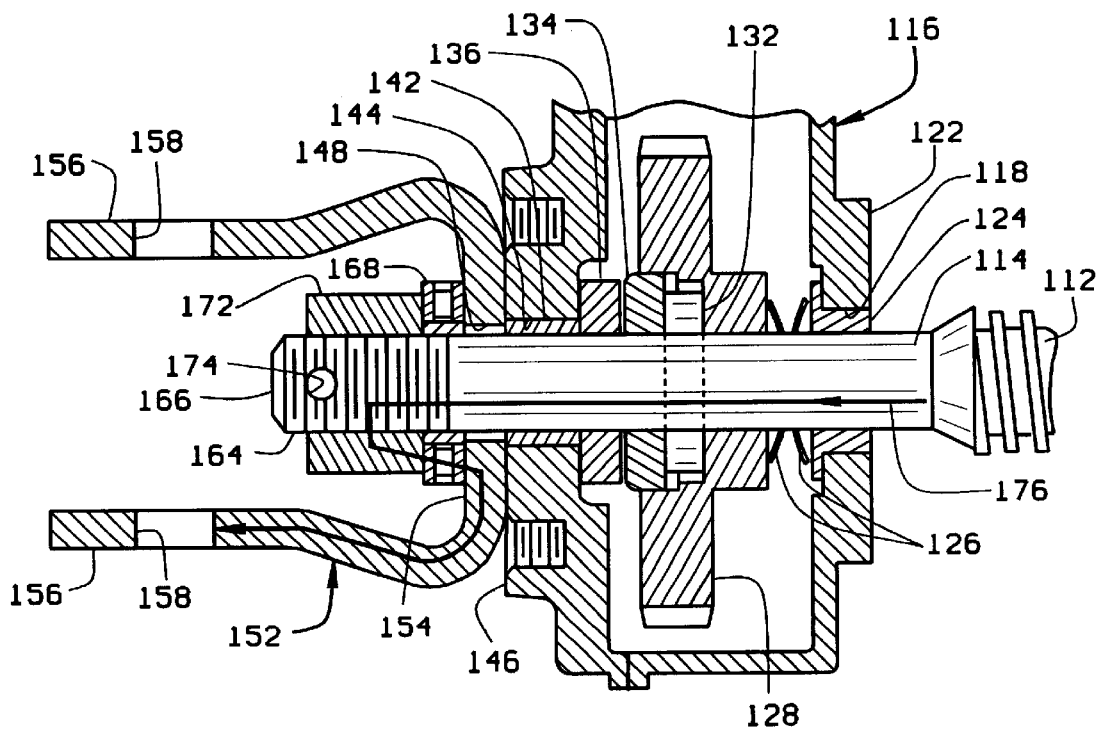
FIG. 4 is a partial view similar to that of FIG. 3 but showing the improved trunnion mount of the invention.

FIG. 4 shows the trunnion mount of the present invention that may be employed in replacing the prior art actuator mount of FIGS. 1–3. However, it should be understood that the operative environment of the linear actuator trunnion mount shown in FIG. 1 is relied on herein only in explaining how tensile forces exerted on a lead screw of a linear actuator can be transmitted to an actuator mount resulting in the failure of the prior art actuator mount. It is not intended that the operative environment of FIG. 1 in any way limit the trunnion mount of the invention shown in FIG. 4. The trunnion mount of the invention shown in FIG. 4 can be used in any application of a trunnion mount for a linear actuator.

The linear actuator trunnion mount of the invention shown in FIG. 4 also employs a lead screw having a first portion or distal portion 112 that extends outside of a transmission housing. A nut assembly 32 of the type shown in FIGS. 1 and 2 is mounted on the lead screw distal portion 112. The second portion of the lead screw, or the proximal portion 114, extends into a transmission housing 116. The proximal portion 114 of the lead screw extends through a first opening 118 in a first end wall 122 of the transmission housing. A bearing or bushing 124 mounts the proximal portion 114 of the lead screw for rotation in the end wall. Instead of a thrust washer, a spring assembly comprised of a pair of spring washers or Belleville springs 126 is then mounted on the proximal portion 114 of the lead screw. The drive element, in this case a drive gear 128, is then mounted on the proximal portion 114 of the lead screw and is secured thereto by a pin 132 in the same manner as the prior art drive element described earlier. First 134 and second 136 spacers are then mounted on the lead screw proximal portion 114 in the same manner as the prior art actuator mount, with the first spacer 134 being received in the circular recess in the gear 128. The lead screw proximal portion 114 then passes through a bearing or bushing 142 mounted in a second opening 144 in the second end wall 146 of the transmission housing. The bushing 142 mounts the lead screw proximal portion 114 for rotation in the second opening 144 of the second end wall. However, unlike the prior art actuator mount, the lead screw proximal portion 114 extends completely through the second end wall 146 of the transmission housing.

The lead screw proximal portion 114 extends through a shaft hole 148 in the trunnion 152 of the invention. The trunnion 152 includes a base portion 154 through which the shaft hole 148 extends and a pair of projecting arms 156 that extend at right angles from the base portion 154. The pair of arms 156 have coaxial holes 158 that pass therethrough and receive a pivot pin 42 that mounts the arms to the frame flange 46, thereby securing the trunnion 152 for pivoting movement relative to the frame flange 46, but preventing any axial or linear movement of the trunnion 152 relative to the frame flange 46. The lead screw proximal portion 114 passes through the trunnion shaft hole 148 and has a section of external screw threading 164 formed thereon. The external screw threading 164 extends to the proximal end 166 of the lead screw. A thrust bearing 168 is mounted over the screw threading 164 of the lead screw proximal portion and a complementary internally threaded nut 172 is screw threaded over the external screw threading 164. The nut 172 functions as an enlarged head of the lead screw proximal portion 114 adjacent is proximal end 166 that cannot be pulled through the shaft hole 148 of the trunnion. A hole 174 for a cotter pin (not shown) passes through the lead screw adjacent its proximal end 166 to prevent the nut 172 from backing off the lead screw. The thrust bearing 168 positioned between the nut 172 and the trunnion 152 permits the lead screw to rotate freely in opposite directions of rotation relative to the trunnion, but prevents any axial movement of the lead screw relative to the trunnion, in particular axial movement to the right which would be caused by tensile forces exerted on the lead screw.

With the construction of the trunnion mount of the invention shown in FIG. 4 and described above, the path of tensile forces represented by the darkened line 176 in FIG. 4 passes completely through the transmission housing 116 bypassing the drive gear 128 and the pin 132 securing the gear to the lead screw proximal portion 114. The tensile forces are transmitted to the nut 172 screw threaded on the lead screw proximal portion 114 which in turn, through the thrust bearing 168, transmits the tensile forces to the trunnion 152. The trunnion arms 156 transmit the tensile forces to the frame flange 46 by the pivot pin 162.

Thus, the particular construction of the trunnion mount of the invention described above and shown in FIG. 4 overcomes the problems associated with the prior art actuator mount by providing a trunnion mount that transmits tensile forces exerted on the lead screw directly to the trunnion 152 connecting the lead screw to the frame flange 46 and avoiding any transmission of tensile forces to the transmission housing 116 or the drive gear 128 and pin 132 mounting the gear on the lead screw proximal portion 114.

While the present invention has been described by reference to a specific embodiment, it should be understood that modifications and variations of the invention may be constructed without departing from the scope of the invention defined in the following claims.

What is claimed:

1. A mount for a linear actuator comprising:
   a drive shaft having a center axis and a length with opposite proximal and distal ends, a distal portion of the shaft length adjacent the shaft distal end and a proximal portion of the shaft length adjacent the shaft proximal end;
   a drive mechanism mounted on the proximal portion of the shaft with the shaft proximal end and the shaft distal end at opposite sides of the drive mechanism; and, a trunnion mounted on the proximal portion of the shaft to receive tensile forces exerted on the shaft whereby tensile forces exerted on the drive shaft are transmitted by the drive shaft through the drive mechanism directly to the trunnion thereby avoiding tensile forces exerted on the drive mechanism.

2. The mount of claim 1, wherein:
the trunnion is mounted on the proximal portion of the shaft to permit relative rotation between the trunnion and the shaft and to prevent axial movement in at least one direction between the trunnion and the shaft.

3. The mount of claim 1, wherein:
the drive mechanism and the trunnion are separate component parts of the mount.

4. The mount of claim 1, wherein:
the drive mechanism includes a drive element mounted on the shaft by a pin inserted through the shaft.

5. The mount of claim 4, wherein:
the drive element is a plastic gear.

6. The mount of claim 1, wherein:
the drive mechanism includes a transmission housing having first and second aligned openings in opposite side walls of the transmission housing, the proximal portion of the shaft passes through the first opening into an interior volume of the transmission housing and then through the second opening to the trunnion outside the transmission housing.

7. The mount of claim 6, wherein:
the drive mechanism also includes a drive element in the interior volume of the transmission housing and mounted to the proximal portion of the shaft by a pin through the proximal portion of the shaft.

8. The mount of claim 7, wherein:
the drive element is a plastic gear.

9. The mount of claim 1, wherein:
the distal portion of the drive shaft is a lead screw that receives a nut assembly thereon for axial movement of the nut assembly along the lead screw in response to rotation of the drive shaft.

10. The mount of claim 7, wherein:
the proximal portion of the shaft is mounted in the transmission housing first opening by a bearing and a spring assembly is mounted on the proximal portion of the shaft between the bearing and the drive element.

11. A mount for a linear actuator comprising:
a drive shaft having a center axis and a length with opposite proximal and distal ends, a distal portion of the shaft length adjacent the shaft distal end and a proximal portion of the shaft length adjacent the shaft proximal end;
a drive mechanism mounted on the proximal portion of the shaft with the shaft proximal end and the shaft distal end at opposite sides of the drive mechanism; and,
a trunnion mounted on the proximal portion of the shaft to receive tensile forces exerted on the shaft; and
the trunnion has a base with a shaft hole passing therethrough, the proximal portion of the shaft extends through the shaft hole to the proximal end of the shaft, and a head larger than the shaft hole is positioned on the proximal portion of the shaft adjacent the shaft proximal end where the head prevents the shaft proximal end from being withdrawing through the shaft hole.

12. The mount of claim 11, wherein:
the trunnion has a general U-shape with the base at its center and a pair of arms projecting outwardly from the base, each of the arms having a pivot pin opening.

13. The mount of claim 11, wherein:
a bearing is mounted on the shaft between the trunnion base and the head.

14. The mount of claim 11, wherein:
the head is a nut screw threaded on the proximal portion of the shaft.

15. A mount for a linear actuator comprising:
a drive shaft having a center axis and a length with opposite proximal and distal ends, the shaft length having a distal portion adjacent the distal end and a proximal portion adjacent the proximal end, the distal portion of the shaft length being a lead screw;
a transmission housing having an interior volume and first and second aligned openings through the transmission housing to the interior volume, the proximal portion of the drive shaft passing through the first opening, through the interior volume and through the second opening of the transmission housing with the proximal end of the drive shaft being outside the transmission housing;
a drive element mounted on the proximal portion of the drive shaft in the interior volume of the transmission housing for rotation of the drive element with the drive shaft; and,
a trunnion mounted on the proximal portion of the drive shaft adjacent the proximal end, the trunnion being mounted on the drive shaft to receive tensile forces exerted on the drive shaft whereby tensile forces exerted on the drive shaft are transmitted by the drive shaft through the drive element directly to the trunnion thereby avoiding tensile forces exerted on the drive element.

16. The mount of claim 15, wherein:
the transmission housing and the trunnion are separate component parts of the mount.

17. The mount of claim 15, wherein:
the drive element is a plastic gear.

18. A mount for a linear actuator comprising:
a drive shaft having a center axis and a length with opposite proximal and distal ends, the shaft length having a distal portion adjacent the distal end and a proximal portion adjacent the proximal end, the distal portion of the shaft length being a lead screw;
a transmission housing having an interior volume and first and second aligned openings through the transmission housing to the interior volume, the proximal portion of the drive shaft passing through the first opening, through the interior volume and through the second opening of the transmission housing with the proximal end of the drive shaft being outside the transmission housing;
a drive element mounted on the proximal portion of the drive shaft in the interior volume of the transmission housing for rotation of the drive element with the drive shaft;
a trunnion mounted on the proximal portion of the drive shaft adjacent the proximal end, the trunnion being mounted on the drive shaft to receive tensile forces exerted on the drive shaft; and
the trunnion has a shaft hole passing therethrough and the proximal portion of the shaft extends from the second opening of the transmission housing and through the trunnion shaft hole to the proximal end of the shaft, and a head that is larger than the shaft hole is positioned on the proximal portion of the shaft adjacent the shaft proximal end where the head prevents the shaft proximal end from being withdrawn through the shaft hole when the shaft is subjected to a tensile force.

19. The mount of claim 18, wherein:
a thrust bearing is mounted on the proximal portion of the shaft between the head and the trunnion.

20. A mount for a linear actuator comprising:
a drive shaft having a center axis and a length with opposite proximal and distal ends, the shaft length having a distal portion adjacent the distal end and a proximal portion adjacent the proximal end, the distal portion of the shaft length being a lead screw a transmission housing having an interior volume and first and second aligned openings through the transmission housing to the interior volume, the proximal portion of the drive shaft passing through the first opening, through the interior volume and through the second opening of the transmission housing with the proximal end of the drive shaft being outside the transmission housing;

a drive element mounted on the proximal portion of the drive shaft in the interior volume of the transmission housing for rotation of the drive element with the drive shaft;

a trunnion mounted on the proximal portion of the drive shaft adjacent the proximal end, the trunnion being mounted on the drive shaft to receive tensile forces exerted on the drive shaft; and, a bearing mounts the proximal portion of the shaft in the first opening of the transmission housing and a spring assembly is mounted on the proximal portion of the shaft between the bearing and the drive element.

\* \* \* \* \*